US012411219B2

(12) United States Patent
Kim et al.

(10) Patent No.: US 12,411,219 B2
(45) Date of Patent: Sep. 9, 2025

(54) SYSTEM AND METHOD FOR INSPECTING VEHICLE LIDAR SENSOR

(71) Applicants: Hyundai Motor Company, Seoul (KR); Kia Corporation, Seoul (KR)

(72) Inventors: Jin Seok Kim, Gyeonggi-do (KR); Changmo Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 945 days.

(21) Appl. No.: 17/545,414

(22) Filed: Dec. 8, 2021

(65) Prior Publication Data

US 2022/0283274 A1    Sep. 8, 2022

(30) Foreign Application Priority Data

Mar. 4, 2021  (KR) .................. KR10-2021-0028609

(51) Int. Cl.
  *G01S 7/497*    (2006.01)
  *G01M 17/007*   (2006.01)
  *G01S 17/931*   (2020.01)

(52) U.S. Cl.
  CPC ......... *G01S 7/497* (2013.01); *G01M 17/0074* (2013.01); *G01S 17/931* (2020.01)

(58) Field of Classification Search
  CPC ...... G01S 7/497; G01S 17/931; G01S 7/4972; G01M 17/0074; B60W 2420/408; G05D 2111/17; H04N 5/33
  See application file for complete search history.

(56) References Cited

U.S. PATENT DOCUMENTS

| | | | |
|---|---|---|---|
| 12,085,678 B1* | 9/2024 | Shotan | G08G 1/22 |
| 2020/0174107 A1* | 6/2020 | Briggs | G06T 7/73 |
| 2021/0407130 A1* | 12/2021 | Qian | G06V 30/1918 |

OTHER PUBLICATIONS

Z. Pusztai et al., "Accurate Calibration of Multi-LiDAR-Multi-Camera Systems", Sensors, 18, 2139 (Jul. 3, 2018).
C. Guindel et al., "Automatic Extrinsic Calibration for Lidar-Stereo Vehicle Sensor Setup", IEEE, (2017).

* cited by examiner

*Primary Examiner* — Kara E. Geisel
*Assistant Examiner* — Christina I Xing
(74) *Attorney, Agent, or Firm* — Fox Rothschild LLP

(57) ABSTRACT

A system for inspecting a LIDAR sensor for correcting an error of the LIDAR sensor in a vehicle includes: a centering unit which aligns the vehicle equipped with a communication terminal to match a reference inspection position of the LIDAR sensor; screen panels miniaturized so that an uppermost end point of a LIDAR beam according to an irradiation angle of the LIDAR sensor is projected on a center portion of the screen; a Near Infrared camera which captures the LIDAR beam; and a server which detects an installation error in which the uppermost end points of the LIDAR beams are different, generates a sensor correction value, and transmits the sensor correction value to the LIDAR sensor.

20 Claims, 13 Drawing Sheets

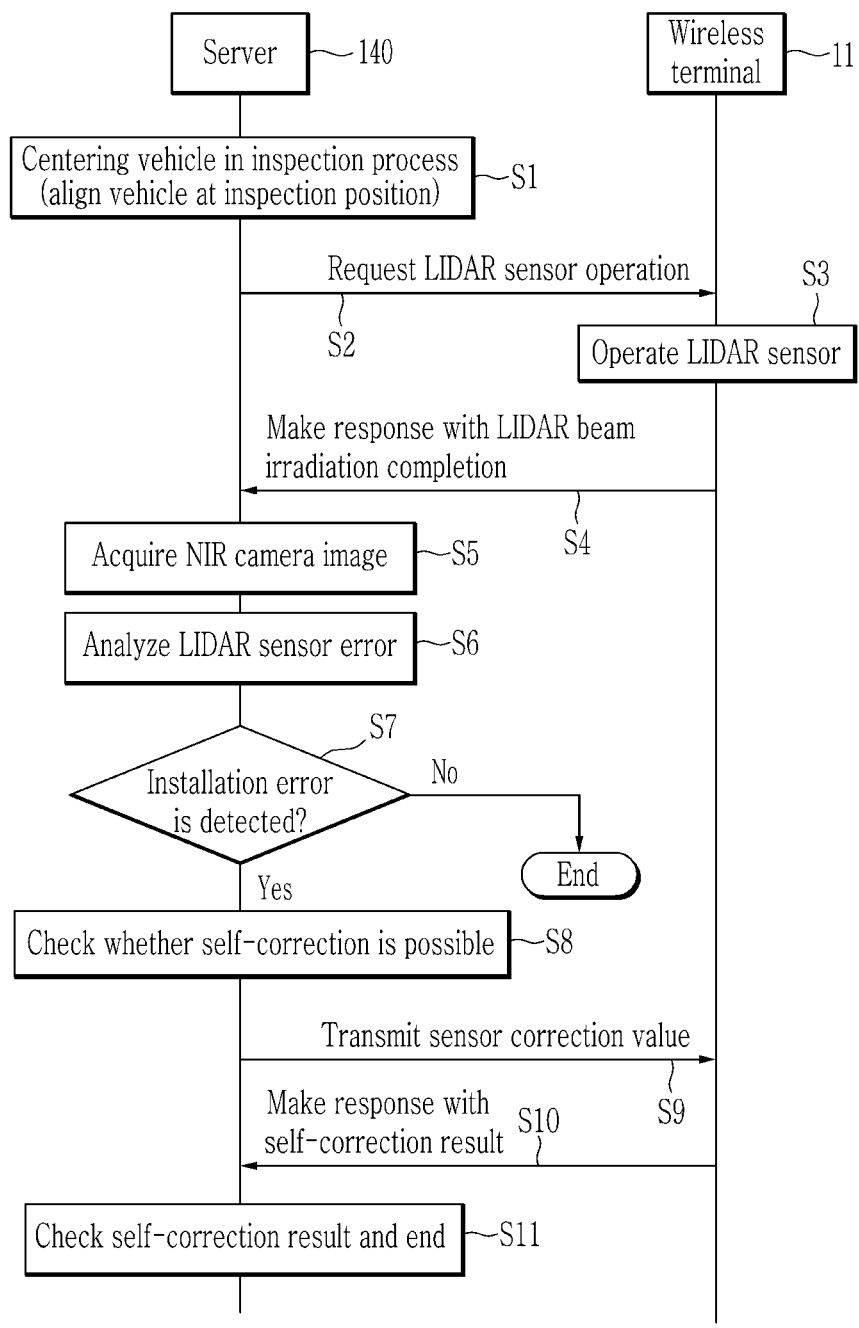

FIG. 6
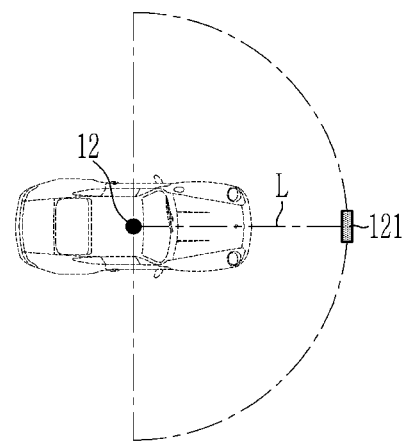
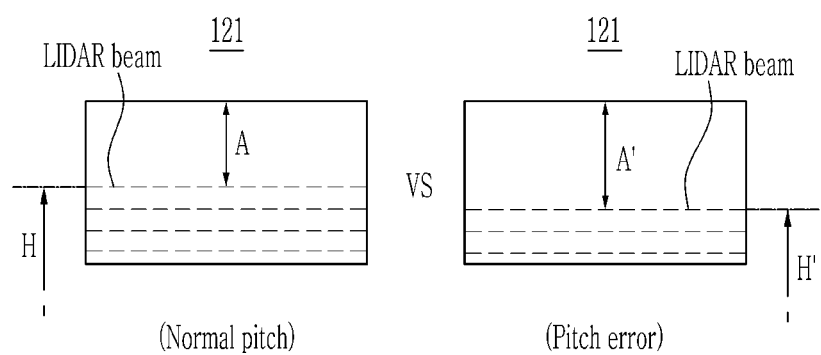

SYSTEM AND METHOD FOR INSPECTING VEHICLE LIDAR SENSOR

CROSS-REFERENCE TO RELATED APPLICATION

This application claims under 35 U.S.C. § 119 the benefit of Korean Patent Application No. 10-2021-0028609 filed in the Korean Intellectual Property Office on Mar. 4, 2021, the entire contents of which are incorporated herein by reference.

BACKGROUND

(a) Technical Field

The present disclosure relates to a system and method of inspecting a vehicle LIDAR sensor, more particularly, to the system and method that includes determining an installation error of a LIDAR sensor assembled in a vehicle.

(b) Description of the Related Art

In general, an autonomous vehicle or autonomous mobile robot is equipped with various autonomous driving sensors, such as LIDAR, cameras, radar, and GPS, for recognizing surrounding objects.

Among them, the LIDAR sensor plays an important role in supporting safe autonomous driving by irradiating lasers and detecting surrounding terrain and objects based on a reflected signal. Whether the LIDAR sensor is installed in a correct position greatly affects detection performance, so that a manufacturing facility (i.e., factory) typically inspects whether the LIDAR sensor is installed at the correct position after assembling the LIDAR sensor in the vehicle.

FIGS. 11A-11B (RELATED ART) illustrates a method of inspecting a LIDAR sensor in a vehicle factory.

Referring to FIGS. 11A-11B, in an existing vehicle manufacturing facility, a position and an amount of distortion of a LIDAR sensor are measured by disposing a correction target in an operation range of the LIDAR sensor of an autonomous vehicle (hereinafter, referred to as the "vehicle"), irradiating lasers through the LIDAR sensor, and then recognizing a signal reflected from the correction target. For example, the correction target may be an aluminum flat plate of 2 m×1 m in size and weighs about 50 kg, and two correction targets are disposed on the left and right for each LIDAR sensor. The LIDAR sensors are configured to detect the entire area (360 degrees) around the vehicle and may be disposed in plural on both sides and a rear side, as well as a front side, or may be rotatably mounted on the roof top.

However, it is difficult to dispose the correction target that spans both vertical and horizontal LIDAR irradiation angles for multi-LIDAR sensor inspection, and the weight of the correction target may be excessive, thus making it difficult to implement the correction target in a movable manner.

Further, in the LIDAR sensor inspection process in the related art, a beam irradiated to the correction target needs to be reflected, so that a large measuring space is required for targeting and when multi-LIDAR sensors are used, there is a problem in that it is difficult to apply in-line due to the increase in a process size.

Further, the correction target in the related art cannot be inspected in parallel with other heterogeneous sensors due to radar signals or light reflection due to the characteristics of the material, so that there is a problem in that the number of processes, equipment, space, time, and potential cost increases due to the operation of a separate inspection process.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a system and a method of inspecting a vehicle LIDAR sensor, which are capable of simultaneously correcting a LIDAR sensor and heterogeneous sensors required for autonomous driving without space restriction by using a small screen panel and a Near Infrared (NIR) camera that do not adversely affect LIDAR reflection.

An exemplary embodiment of the present disclosure provides a system for inspecting a LIDAR sensor for correcting an error of the LIDAR sensor in a vehicle, the system including: a centering unit which aligns the vehicle entering an inspection process to match a reference inspection position of the LIDAR sensor; a plurality of screen panels installed at a predetermined distance L and height h within an operation range with respect to the LIDAR sensor and miniaturized so that an uppermost end point H of a LIDAR beam according to an irradiation angle is projected on a center portion of the screen; a Near Infrared (NIR) camera which captures the LIDAR beam projected on the screen panel when the LIDAR sensor is operated; and a server which detects an installation error in which the uppermost end points H of the lidar beam are different by comparing the lidar beam images acquired from the plurality of screen panels through the NIR camera, generates a sensor correction value for self-correcting the installation error, and transmits the sensor correction value to the LIDAR sensor through a communication terminal equipped in the vehicle.

Further, the system may further include a correction target additionally installed in a lower space of the screen panel, in which an irradiation angle of a heterogeneous sensor including a radar or a camera may be inspected in parallel through the server.

Further, when a tire is seated on a driving roller, the centering unit may physically press each wheel through a mechanical position adjustment unit provided at a side of the vehicle and aligns the vehicle to match the reference inspection position.

Further, the NIR camera may be disposed above the vehicle, and is installed rotatably toward each screen panel by a rotating body operated by a motor.

Further, the server may include a communication unit configured to connect diagnosis communication with the communication terminal of the vehicle; a facility operating unit including an interface for interworking with various facilities in the inspection process; a database (DB) which matches and stores an ID of the communication terminal equipped in the vehicle and a corresponding Vehicle Identification Number (VIN); and a control unit which controls a general operation for inspecting the LIDAR sensor, and recognizes the VIN matched to the unique ID of the communication terminal when the diagnosis communication is connected and sets installation information and an inspection reference of an autonomous driving sensor applied according to a product specification.

Further, the control unit may calculate the uppermost end point H of the LIDAR beam by using a vertical length 1 of the screen panel, an installation height h from the floor, and a distance A between an upper end of the screen and the LIDAR beam according to the installation information by analyzing the LIDAR beam image.

Further, the control unit may detect a pitch error in which the uppermost end points H of the LIDAR beams of the screen panels positioned in front of and behind the LIDAR sensor are different.

Further, the control unit may calculate a pitch error angle by using a difference value between the uppermost end point H of a normal LIDAR beam and the uppermost end point H' of a defective LIDAR beam irradiated to the front screen panel and a distance L between the LIDAR sensor and the screen.

Further, the control unit may detect a roll error in which the uppermost end points H of the LIDAR beams irradiated to the screen panels positioned at left and right sides of the LIDAR sensor are different.

Further, the control unit may calculate a roll error angle by using a difference value between the uppermost end point H of a normal LIDAR beam and the uppermost end point H' of a defective LIDAR beam irradiated to the screen panel positioned at the one side of the LIDAR sensor and a distance L between the LIDAR sensor and the screen.

Further, the control unit may detect a yaw error by comparing left end points and right end points of the screen panels positioned at the left side and the right side of the LIDAR sensor.

Further, the control unit may calculate a yaw error angle by using a difference value between a normal end point B and a defective end point B' of the LIDAR beam in the screen panel positioned at one side and a distance L between the LIDAR sensor and the screen.

Further, the control unit may detect a pitch error angle and a roll error angle by comparing a distance A' between an upper end of each screen and the LIDAR beam measured by using the screen panels positioned on the front and one side of the LIDAR sensor with a reference distance A set with a normal roll angle.

Further, the screen panel may be coupled with a moving body and installed to be movable 360 degrees along a circular guide rail around the LIDAR sensor.

Another exemplary embodiment of the present disclosure provides a method of inspecting, by a server of a LIDAR sensor inspecting system within a vehicle factory, an installation error of the LIDAR sensor by interlocking with a communication terminal equipped in the vehicle, the method including steps of: a) performing communication with a communication terminal of the vehicle entering an inspection process and aligning the vehicle to a reference inspection position of the LIDAR sensor through a centering unit; b) operating the LIDAR sensor through the communication terminal and acquiring a LIDAR beam image captured in a screen panel installed at a predetermined distance L and height h within an operation range with respect to the LIDAR sensor through a Near Infrared (NIR) camera; c) detecting an installation error in which the uppermost end points H of the LIDAR beams are different by comparing the LIDAR beam images acquired from the plurality of screen panels; and d) generating a sensor correction value for self-correcting the installation error, and transmitting the sensor correction value to the LIDAR sensor through a communication terminal.

Further, step c) may include calculating a pitch error angle by using a difference value between the uppermost end point H of a normal LIDAR beam and the uppermost end point H' of a defective LIDAR beam in the front screen panel and a distance L between the LIDAR sensor and the screen.

Further, step c) may include calculating a roll error angle by using a difference value between the uppermost end point H of a normal LIDAR beam and the uppermost end point H' of a defective LIDAR beam in the screen panel positioned at one side of the LIDAR sensor and a distance L between the LIDAR sensor and the screen.

Further, step c) may include calculating a yaw error angle by using a difference value between a normal end point B and a defective end point B' of the LIDAR beam in the screen panels positioned at a left side and a right side of the LIDAR sensor and a distance L between the LIDAR sensor and the screen.

Further, step d) may include checking whether the generated sensor correction value is in a range self-correctable by the LIDAR sensor, and transmitting the generated sensor correction value to the communication terminal when the self-correction is possible, and determining to manually correct the error in a repair process when the self-correction is impossible.

Still another exemplary embodiment of the present disclosure provides a system for inspecting a vehicle LIDAR sensor for correcting a LIDAR sensor error of a vehicle, the system including: a centering unit which aligns the vehicle entering an inspection process to match a reference inspection position of the LIDAR sensor; a Near Infrared (NIR) camera which is configured in an integrated module with a screen panel installed at a predetermined distance L and height h side by side within an operation range around the LIDAR sensor and captures a LIDAR beam image projected on the screen panel when the LIDAR sensor is operated; and a server which collects the LIDAR beam image captured by the NIR camera, inspects an installation error by comparing the uppermost end point of the LIDAR beam captured by each of the screen panels in front and at one side of the LIDAR sensor and the uppermost end point of a normal LIDAR beam, generates a sensor correction value for self-correcting the installation error, and transmits the sensor correction value to the LIDAR sensor through a communication terminal equipped in the vehicle.

According to the exemplary embodiment of the present disclosure, it is possible to reduce a space required for an inspection process and inline application is easy by correcting an installation error of a LIDAR sensor by utilizing the screen panel which is smaller and lighter than the existing correction target and the NIR camera.

Further, when the LIDAR sensor is inspected, it is possible to inspect the heterogeneous sensors, such as a radar or a camera, in parallel without space restriction by using the screen panel that does not adversely affect reflection and utilizing the space secured by miniaturization.

Further, it is possible to precisely correct a pitch error, a roll error, and a yaw error by measuring a LIDAR beam in various directions by installing the miniaturized screen panel to be movable around the vehicle and the LIDAR sensor.

BRIEF DESCRIPTION OF THE DRAWINGS

FIG. 5 is a flowchart schematically illustrating a method of inspecting a vehicle LIDAR sensor according to an exemplary embodiment of the present disclosure.

FIG. 6 is a top plan view illustrating a method of correcting a pitch error according to a first exemplary embodiment of the present disclosure.

DETAILED DESCRIPTION OF THE EMBODIMENTS

Figure 1:
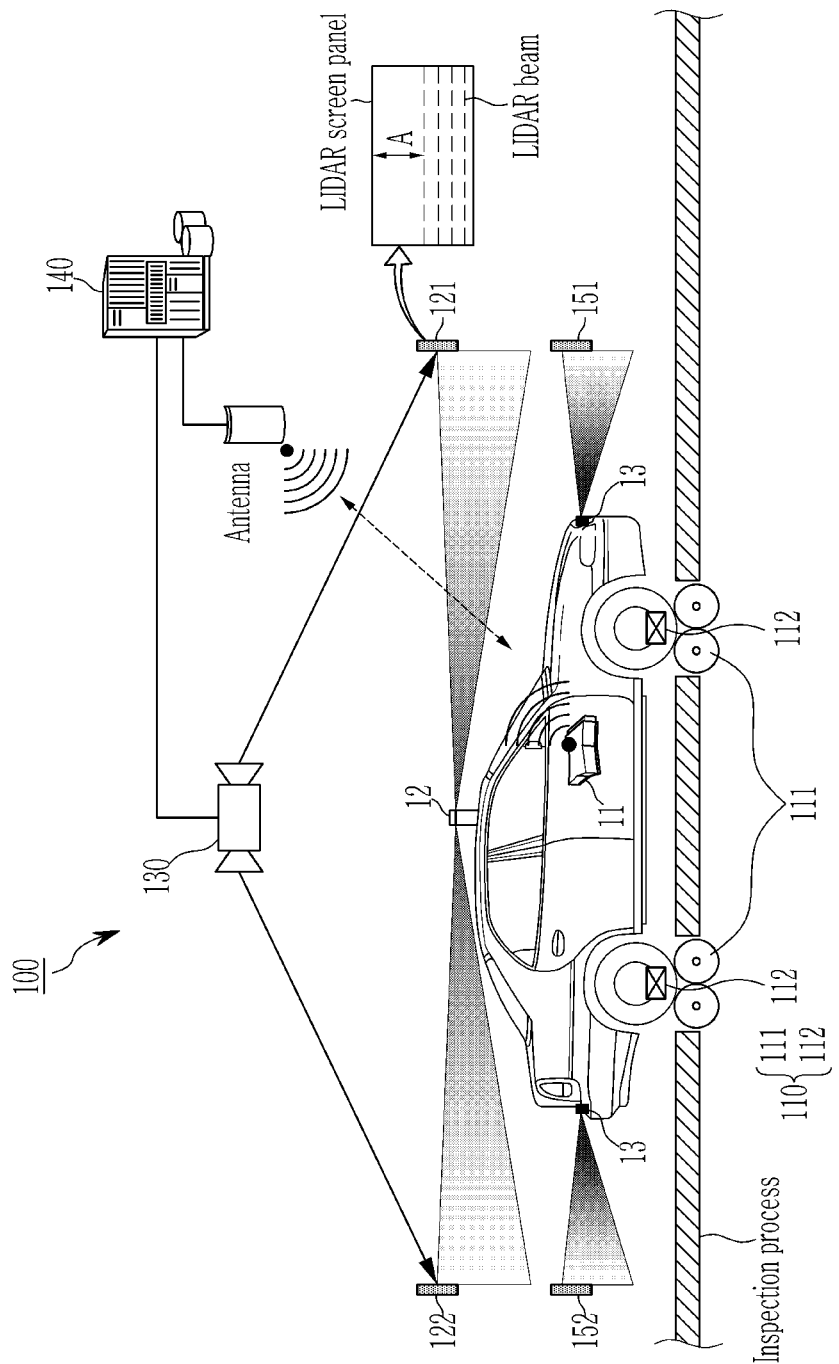
FIG. 1 is a diagram schematically illustrating a configuration of a system for inspecting a vehicle LIDAR sensor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, in describing the constructional elements of the present disclosure, the terms of a first, a second, A, B, (a), (b), or the like, can be used, but the constituent elements shall not be limited by the terms. Such a term is only for discriminating the constructional element from another constructional element, and does not limit the essential feature.

It should be understood that when one constituent element is referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

The term used in the present specification is simply used for describing a specific embodiment and does not intend to limit the present disclosure. A singular expression includes a plural expression unless it is specifically described to the contrary in the context.

All terms used herein including technical or scientific terms have the same meanings as meanings which are generally understood by those skilled in the art unless they are differently defined in the present specification. Terms defined in generally used dictionary shall be construed that they have meanings matching those in the context of a related art, and shall not be construed in ideal or excessively formal meanings unless they are clearly defined in the present application.

Now, a system and a method of inspecting a vehicle LIDAR sensor according to an exemplary embodiment of the present disclosure will be described in detail with reference to the drawings.

FIG. 1 is a diagram schematically illustrating a configuration of a system for inspecting a vehicle LIDAR sensor according to an exemplary embodiment of the present disclosure.

Referring to FIG. 1, a system 100 for inspecting a vehicle LIDAR sensor according to an exemplary embodiment of the present disclosure is installed for a vehicle inspection process of correcting an installation state of a LIDAR sensor 12 assembled to a vehicle 10, and may include a centering unit 110, a screen panel 120, a Near Infrared (NIR) camera 130, and a server 140.

The vehicle 10 may include a communication terminal 11 and a LIDAR sensor 12, and may further include a heterogeneous sensor 13 required for autonomous driving, such as a radar or a camera.

The communication terminal 11 is equipped in the vehicle 10 assembled according to a production line of a factory, and matches and stores a unique ID and a Vehicle Identification Number (VIN) of each communication terminal 11. The communication terminal 11 is temporarily mounted in the factory to support product identification, location tracking, status diagnosis, remote control of electric equipment, and the like.

For example, the communication terminal 11 may connect diagnosis communication with the external server 140 by wire or wirelessly through On-Board Diagnostics (OBD), and operate electric equipment within the vehicle, such as the LIDAR sensor 12, according to an instruction of the server 140.

Further, when an installation error occurs in the LIDAR sensor 12, the communication terminal 11 receives a sensor correction value from the server 140 and transmits the received sensor correction value to the LIDAR sensor 12. Further, the communication terminal 11 may transmit the corrected sensor angle value of the LIDAR sensor 12 to the server 140.

The LIDAR sensor 12 transmits a LIDAR signal during autonomous driving of the vehicle 10 and receives a reflected signal to detect surrounding terrain and object. Similarly, the heterogeneous sensor 13, such as the radar or the camera, detects surrounding areas with its own function and support autonomous driving.

As described above, an inspection process of correcting an installation error so as to transmit a signal to a determined operation range for securing detection performance is essentially applied to the LIDAR sensor 12 supporting the autonomous driving of the vehicle 10 and the heterogeneous sensor 13, such as the radar or the camera. Herein, the installation error includes an error and an assembly error in a manufacturing process of the corresponding sensor.

One or more LIDAR sensors 12 are installed at a plurality of locations based on the vehicle 10 and transmit LIDAR signals to operation ranges (for example, 120 to 180 degrees) in determined directions, respectively. For example, for convenience, in FIG. 1, the multi-LIDAR sensor is illustrated as an integrated structure at one point of a roof. However, in actual, the LIDAR sensors 12 may be divided into various parts, such as a bumper or a roof, according to vehicle design information and installed in various directions, such as front, rear, left, and right sides. Further, the exemplary embodiment of the present disclosure is not limited thereto, and a 360-degree LIDAR sensor 12 which is mounted to the roof of the vehicle 10 and transmits a LIDAR signal while rotating may also be applied.

When the LIDAR sensor 12 enters the LIDAR sensor inspection process of the manufacturing factory of the vehicle, the LIDAR sensor 12 may transmit a LIDAR signal according to an operation signal of the communication terminal 11.

The LIDAR sensor 12 may set a sensor angle value for transmitting a LIDAR signal through a control module, and has a calibration function of self-adjusting a sensor angle according to the sensor correction value received from the server 140. For example, the adjustment of the sensor angle may be performed by a software method of setting an offset according to the sensor correction value. However, the exemplary embodiment of the present disclosure is not limited thereto, the sensor angle may also be adjusted by a mechanical method through a mechanism of finely adjusting the sensor angle value.

In the meantime, the centering unit 110 aligns the position of the vehicle with a reference inspection position of the LIDAR sensor 12 through a driving roller 111.

When a tire is seated on the driving roller 111 in the inspection process, the centering unit 110 physically presses each wheel and aligns the position of the vehicle to correspond to the reference inspection position through a mechanical position adjustment unit 112 at the side of the vehicle.

The screen panel 120 is installed at a predetermined distance L and height h within the LIDAR operation range around the LIDAR sensor 12 aligned at the reference inspection position, and is miniaturized and manufactured so that the uppermost end point H of a LIDAR beam according to an irradiation angle s projected on a center portion of the screen.

For example, the screen panel 120 includes a first screen panel 121 positioned at the front of the vehicle 10 and a second screen panel 122 positioned at the rear of the vehicle 10, and visualizes and displays the LIDAR beam transmitted from each LIDAR sensor 20. Further, depending on the inspection method, the screen panel 120 may further include a third screen panel 123 and a fourth screen panel 124 installed at left and right sides of the vehicle 10.

The screen panel 120 may be configured to be lightweight with a small screen made of a synthetic resin material without total reflection and diffuse reflection. The screen panel 120 is disposed at a close distance within about 3 m with respect to the LIDAR sensor 12 and at the same height as that of the LIDAR sensor 12. Accordingly, the plurality of screen panels 120 arranged with respect to the LIDAR sensor 12 are arranged at horizontal positions.

In the screen panel 120, a plurality of LIDAR beams is projected on a display area (screen) in a horizontal line according to the number of channels of the LIDAR sensor 12.

The position of the screen panel 120 is installed so that only the uppermost end point of the LIDAR beam is projected on the center portion of the screen according to the irradiation angle of the LIDAR sensor 12 according to the characteristic of a LIDAR sensor error analysis algorithm which is to be described below. In this case, the size of the screen panel 120 is sufficient if only the uppermost end point of the LIDAR beam can be measured, so that the screen panel 120 may be miniaturized and manufactured. Accordingly, it is possible to improve space utilization by configuring the small and light screen panel 120 that acquires only the projection image of the uppermost end point compared to a correction target that has to cover the entire LIDAR irradiation angle in the related art.

For example, as illustrated in FIG. 1, correction targets 151 and 152 for correcting the irradiation angle of the heterogeneous sensor 13, such as the radar and the camera, may be further installed by utilizing the lower space of the screen panel 120. Accordingly, the LIDAR sensor 12 and the heterogeneous sensor 13 may be simultaneously inspected in one space (process).

The NIR camera 130 is an imaging device using near-infrared rays and captures a LIDAR beam image projected on the screen panel 120 through the operation of the LIDAR sensor 12.

The NIR camera 130 is installed above the top of the vehicle 10, and is configured in plurality toward the installation position of the screen panel 120. As necessary, one NIR camera 130 may be rotatably installed by a rotating body operated by a motor.

The server 140 is a computing system for controlling the general operation of each configuration within the system for inspecting the vehicle LIDAR sensor according to the exemplary embodiment of the present disclosure.

The server 140 compares the LIDAR beam images acquired from the screen panels through the NIR camera 130, and detects an installation error of the LIDAR sensor 12 based on the uppermost end point H of the LIDAR beam irradiated to each screen panel. Further, the server 140 generates a sensor correction value for self-correction of the installation error and transmit the generated sensor correction value to the LIDAR sensor 12 through the communication terminal 11 of the vehicle 10.

Figure 2:
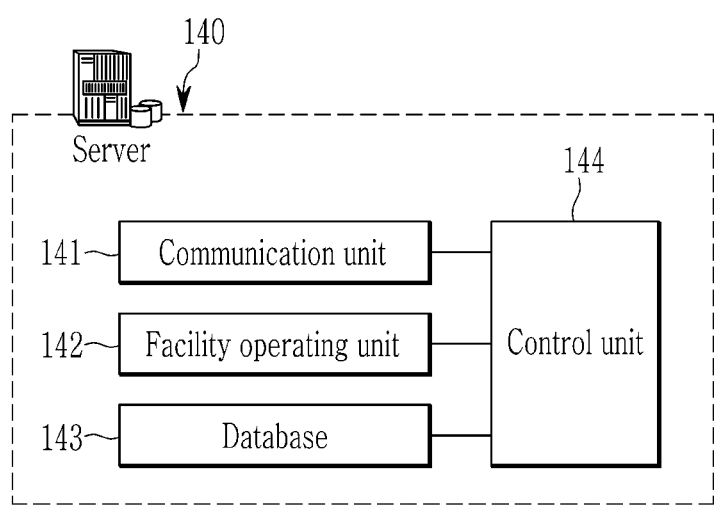
FIG. 2 is a block diagram schematically illustrating a configuration of a server according to the exemplary embodiment of the present disclosure.

FIG. 2 is a block diagram schematically illustrating a configuration of the server according to the exemplary embodiment of the present disclosure.

Referring to FIG. 2, the server 140 according to the exemplary embodiment of the present disclosure includes a communication unit 141, a facility operating unit 142, a database 143, and a control unit 144.

The communication unit 141 performs diagnosis communication with the communication terminal 11 of the vehicle 10 through an antenna, and transmits a control signal (on/off) so as for the LIDAR sensor 12 to transmit the LIDAR beam.

The communication unit 141 receives a LIDAR beam image captured from the NIR camera 130 and transmits the received LIDAR beam image to the control unit 144. In this case, the communication unit 141 assigns an ID matched to the corresponding screen panel 120 to the LIDAR beam image so that the images captured by the plurality of screen panels 121 and 122 are distinguished from each other.

When an installation error of the LIDAR sensor 12 occurs, the communication unit 141 may transmit a sensor correction value for correcting the installation error to the communication terminal 11 and receive a response message indicating that the sensor correction is implemented.

The facility operating unit 142 includes an interface for interworking the server 140 and various facilities in the process of inspecting the vehicle LIDAR sensor.

The facility operating unit 142 may control centering of the vehicle by driving the centering unit 110 connected through the interface.

The database (DB) 143 stores various data and programs for inspecting the LIDAR sensor 12 and stores data generated through the inspection of the LIDAR sensor 12 for each vehicle.

For example, the DB 143 may store a mounting position of the LIDAR sensor 12, centering control information, and an arrangement position of the screen panel 120, an inspection result, and a sensor correction value according to multi-car model and multi-spec design data. Further, the DB 143 may match and store the ID of the communication terminal 11 mounted to the vehicle and the corresponding VIN.

The control unit 144 is a central processing unit controlling the generation operation of each unit for inspecting the vehicle LIDAR sensor according to the exemplary embodiment of the present disclosure. That is, the configuration of each unit may be configured in a form of hardware, software, or a combination of hardware and software, and their respective functions and roles may be operated or interlocked under the control of the control unit 144.

When the control unit 144 communicates with the communication terminal 11 of the vehicle 10 entering the inspection process, the control unit 144 recognizes the VIN matched to the unique ID and sets autonomous driving sensor information and an inspection reference applied according to the product specification.

In the vehicle manufacturing factory, multi-type vehicles and same-type multi-spec vehicles are assembled in one line, and the installation position of the LIDAR sensor 12 is changed accordingly. For example, since the height of the LIDAR sensor 12 may vary depending on the size of the wheel/tire even for the same type of vehicle, the control unit 144 may change the inspection reference to the specification matched to the product specification of the VIN.

When it is confirmed that the vehicle 10 is arranged at the reference inspection position, the control unit 144 transmits the control signal to the communication terminal 11 through the communication unit 141 and operates the LIDAR sensor 12. In this case, the LIDAR beam according to the operation of the LIDAR sensor 12 is displayed at the center portions of the screen panels 121 and 122 disposed at the front and rear sides of the vehicle 10.

The control unit 144 deletes a background through a pre-processing process of the image received through the NIR camera 130 and acquires the LIDAR beam images displayed in the screen panels 121 and 122.

The control unit 144 compares and analyzes the LIDAR beam images of the screen panels 121 and 122 by using the LIDAR sensor error analysis algorithm and detects the installation error of the LIDAR sensor.

In this case, the control unit 144 may compare the upper end of the screen and the uppermost end points H and H' of the LIDAR beam in the LIDAR beam image of each horizontally positioned screen panel 120 and detect an angle error. Further, the control unit 144 generates a sensor correction value for correcting the angle error and transmits the generated sensor correction value to the communication terminal 11 through the communication unit 141.

Figure 3:
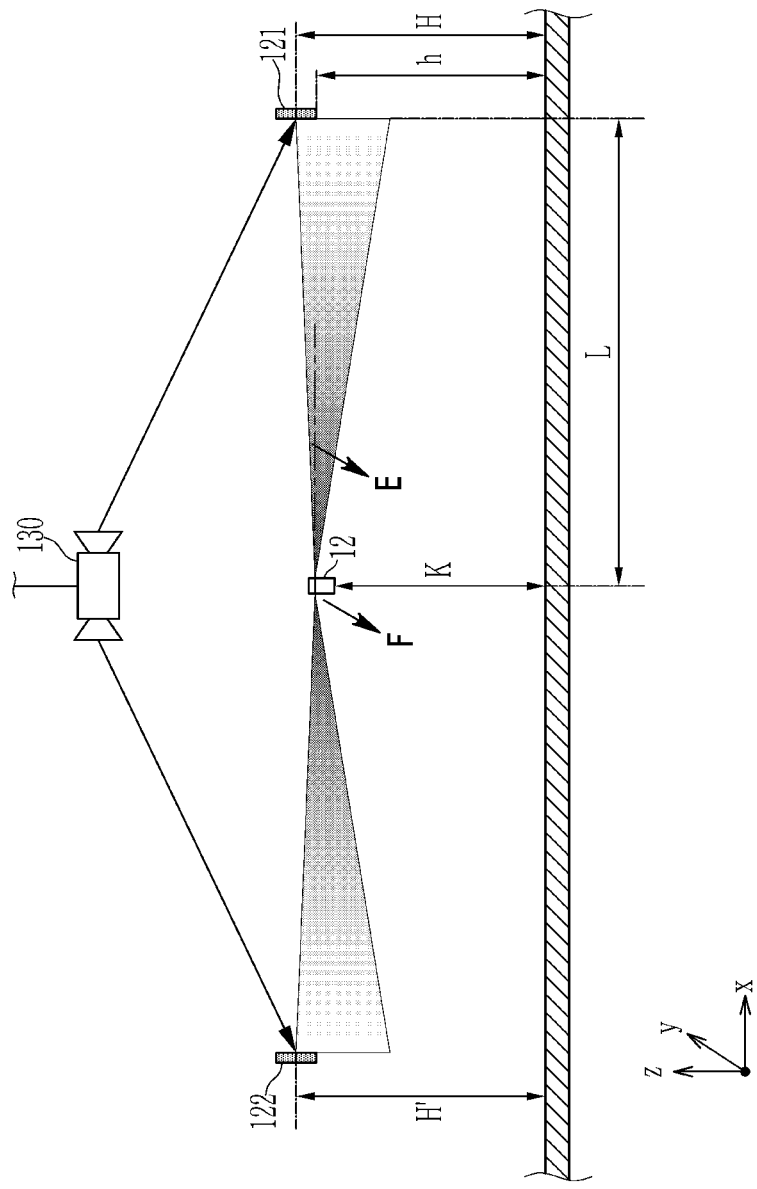
FIGS. 3 and 4A-4B are diagrams for describing a LIDAR sensor error analysis algorithm according to the exemplary embodiment of the present disclosure.
Figure 4A:
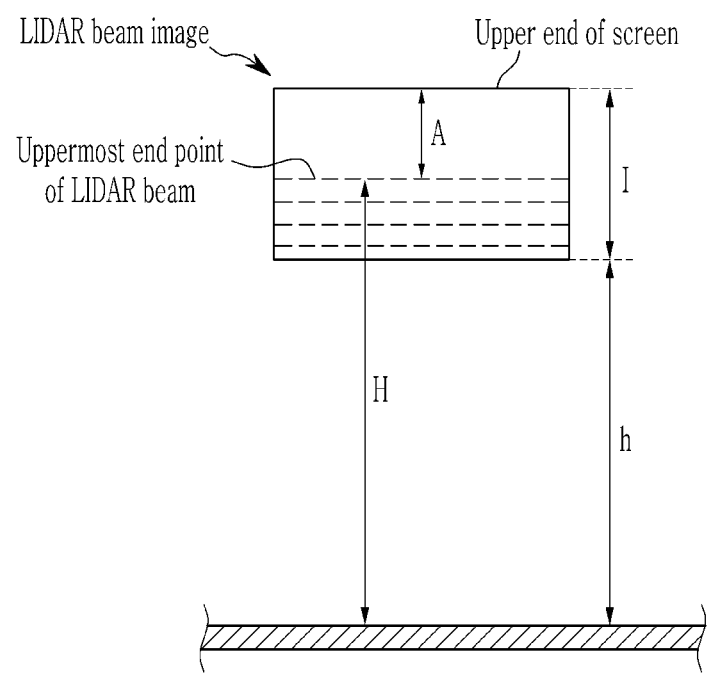
Figure 4B:
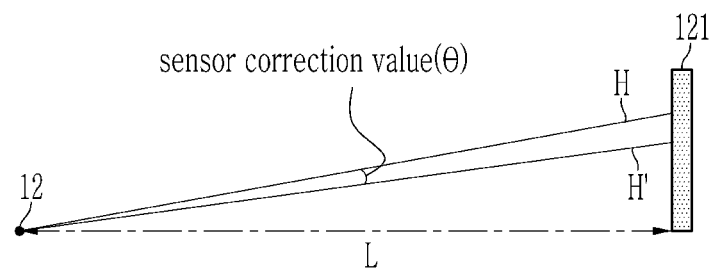

FIGS. 3 and 4A-4B are diagrams for describing the LIDAR sensor error analysis algorithm according to the exemplary embodiment of the present disclosure.

Referring to FIGS. 3 and 4A-4B, as described above, the first screen panel 121 and the second screen panel 122 are horizontally installed at the same distance L and the same installation height H from the floor with respect to the LIDAR sensor 12 in front of and behind the vehicle.

The control unit 144 analyzes the LIDAR beam image and calculates the uppermost end points H and H' of the LIDAR beam by using a vertical length 1 of the screen panel 120, the installation height h from the floor, and a distance A between the upper end of the screen and the LIDAR beam stored as the installation information in advance.

That is, the uppermost end points H and H' of the LIDAR beam may be calculated by using Equation 1 below, which adds the vertical length 1 and the predetermined height h at which the screen panel 120 is installed and then subtracts the distance A between the upper end of the screen and the LIDAR beam.

$$H = h + 1 - A \qquad \text{(Equation 1)}$$

When the uppermost end points H and H' of the LIDAR beam displayed in the first screen panel 121 and the second screen panel 122 are the same, the control unit 144 determines that the first screen panel 121 and the second screen panel 122 are in a horizontal state (0 degree) which is normal. In this case, a height K of the LIDAR sensor 12 may be calculated by using Equation 2 below.

$$K = H - \tan(E) \times L \qquad \text{(Equation 2)}$$

Herein, E means an angle of the uppermost end beam of the horizontal reference LIDAR.

Further, when the uppermost end point H of the LIDAR beam displayed in the first screen panel 121 is different from the uppermost end point H' of the LIDAR beam displayed in the second screen panel 122, the control unit 144 determines that a distortion error is generated in the LIDAR sensor 12.

Referring to FIG. 4B, compared to the uppermost end point H of the LIDAR beam normally displayed in the first screen panel 121, the uppermost end point H' of the LIDAR beam displayed in the second screen panel 122 is in a distorted state.

When a pitch angle of the LIDAR sensor 12 is distorted to one side based on a transverse axis (y-axis), the LIDAR sensor 12 has a plus (+) or minus (−) error angle, so that a sensor correction value θ for correcting the screen panel to be horizontal (0 degree) may be generated.

For example, a pitch error angle of the LIDAR sensor 12 may be calculated by using a difference between the uppermost end point H of the normal LIDAR beam and the uppermost end point H' of the defective LIDAR beam in the front or rear screen panel and the distance L between the LIDAR sensor 12 and the screen.

In this case, the distortion error angle F of the LIDAR sensor 12 may be calculated by Equation 3 below.

$$F = \arctan((H \cdot H')/L) \quad \text{(Equation 3)}$$

The control unit 144 transmits the sensor correction value θ calculated for correcting the error angle F according to the installation error to the communication terminal 11 through the communication unit 141.

As described above, the control unit 144 detects a pitch error angle distorted forward/backward of the LIDAR sensor 12 with respect to the transverse axis (y-axis) by analyzing the LIDAR beam image projected on the first and second screen panels 121 and 122 installed in front of and behind the vehicle 10. Further, the installation error of the LIDAR sensor 12 may be corrected with the sensor correction value θ for correcting the pitch error angle.

Similarly, the control unit 144 may detect a roll error angle distorted with respect to the vertical axis (x-axis) of the LIDAR sensor 12 by analyzing the LIDAR beam images displayed in the third screen panel 123 or the fourth screen panel 124 installed at the left/right side of the LIDAR sensor 12 and correct the detected roll error angle. The pitch error angle may be calculated by using the difference value between the uppermost end point H of the normal LIDAR beam and the uppermost end point H' of the defective LIDAR beam in the left or right screen panel and the distance L between the LIDAR sensor 12 and the screen.

Further, the control unit 144 may detect a yaw error that is a left/right state based on the vertical axis (z-axis) of the LIDAR sensor 12 and correct the yaw error. In this case, the control unit 144 detect a yaw error angle by comparing a left end point and a right end point of the LIDAR sensor 12 having an operation range of a predetermined angle (For example, 120 to 180 degrees) on an X-Y plane and correct the detected yaw error angle. The yaw error angle may be calculated by a difference value between a normal end point B and a defective end point B' in the left screen panel and the distance L between the LIDAR sensor 12 and the screen.

To this end, the control unit 144 may be implemented by one or more processors operated by a set program, and the set program may be programmed so as to perform each operation of the method of inspecting the vehicle LIDAR sensor by the server 140 according to the exemplary embodiment of the present disclosure.

Hereinafter, the method of inspecting the vehicle LIDAR sensor according to the exemplary embodiment of the present disclosure will be described based on the configuration of the foregoing system for inspecting the vehicle LIDAR sensor, and will be described based on an example in which the server 140 is interworked with the communication terminal 11 of the vehicle 10 in the inspection process.

FIG. 5 is a flowchart schematically illustrating a method of inspecting a vehicle LIDAR sensor according to an exemplary embodiment of the present disclosure.

Referring to FIG. 5, the server 140 according to the exemplary embodiment of the present disclosure performs communication with the communication terminal 11 of the vehicle 10 entering the inspection process and aligns the vehicle 10 with a reference inspection position of the LIDAR sensor 12 through the centering unit 30 (S1). In this case, the server 140 may align the vehicle 10 to correspond to the reference inspection position by physically pressing each wheel through the position adjusting unit 112 at the side of the vehicle in the state where the tire of the vehicle is seated on the driving roller 111.

The server 140 requests the operation of the LIDAR sensor 12 of the vehicle 10 by transmitting a control signal to the communication terminal 11 (S2). In this case, the communication terminal 11 may operate the LIDAR sensor 12 according to the control signal and irradiate a LIDAR beam to the screen panel 120 (S3), and make a response with a LIDAR beam irradiation completion message (S4).

When the LIDAR sensor 12 is operated, the server 140 acquires a LIDAR beam image projected on the screen panel 120 through the NIR camera 130 (S5). The server 140 may acquire LIDAR beam images from at least two sides among the front, rear, left, and right sides of the vehicle 10 according to the number of screen panels 120 installed.

The server 140 compares and analyzes the LIDAR beam images for the plurality of screen panels 120 by using the LIDAR sensor error analysis algorithm according to various exemplary embodiments of the present disclosure and inspects an installation error according to the result of the analysis (S6). Herein, the LIDAR sensor error analysis algorithm may include at least one of the foregoing exemplary embodiment and an additional exemplary embodiment which is to be described below.

In this case, when the installation error of the LIDAR sensor 12 is not detected as the result of the inspection (S7, NO), the server 140 terminates the inspection and stores the result.

In the meantime, when the installation error of the LIDAR sensor 12 is detected as the result of the inspection (S7, YES), the server 140 checks whether a sensor correction value for the installation error is within a range self-correctable by the LIDAR sensor 12 (S8). In this case, according to the check result in operation S8, the self-correction in the LIDAR sensor or a manual correction in a repair process is determined.

When it is determined that the installation error is self-correctable as the result of the check in operation S8, the server 140 transmits the sensor correction value to the communication terminal 11 (S9). In this case, the communication terminal 11 self-corrects the installation error by transmitting the sensor correction value to the LIDAR sensor 12 and makes a response with a result of the self-correction (S10).

The server 140 checks the result of the self-correction received from the communication terminal 11 and when the result of the self-correction corresponds to the sensor correction value, the server 140 terminates the inspection.

The foregoing method of inspecting the vehicle LIDAR sensor has been described based on the correction of the installation error of the LIDAR sensor 12, but the present disclosure is not limited thereto, and the heterogeneous sensors may be inspected at the same time. For example, in operation S2, the server 140 may further request an operation of the radar or the camera from the communication terminal 11, and further correct the installed error angle by analyzing the signal detected through the correction target.

In the foregoing, the exemplary embodiment of the present disclosure has been described, but the present disclosure is not limited to the foregoing exemplary embodiment of the present disclosure, and various changes are possible based on the exemplary embodiment of the present disclosure.

For example, the present disclosure may implement various exemplary embodiments by changing/adding the positions and the number of the screen panels 120 according to the type and the measurement parameter of the LIDAR sensor 12 applied to the vehicle 10.

Hereinafter, in describing an additional exemplary embodiment of the present disclosure, the description similar and overlapping the description of the configuration of the system for inspecting the vehicle LIDAR sensor will be omitted, and the changed/added points will be mainly described. It is assumed that the LIDAR sensor 12 has a predetermined operation range, and has a right end point and a left end point.

First, FIG. 6 is a top plan view illustrating a method of correcting a pitch error according to a first exemplary embodiment of the present disclosure.

Referring to FIG. 6, the control unit 144 may detect a pitch error by using only one first screen panel 121 installed at the front of the LIDAR sensor 12 and correct the error.

The control unit 144 may detect a pitch error by comparing a distance A between the upper end of the screen and the LIDAR beam of the first screen panel 121 with a reference distance A set as a normal pitch angle, and generate a sensor correction value for correcting the pitch error.

Figure 7:
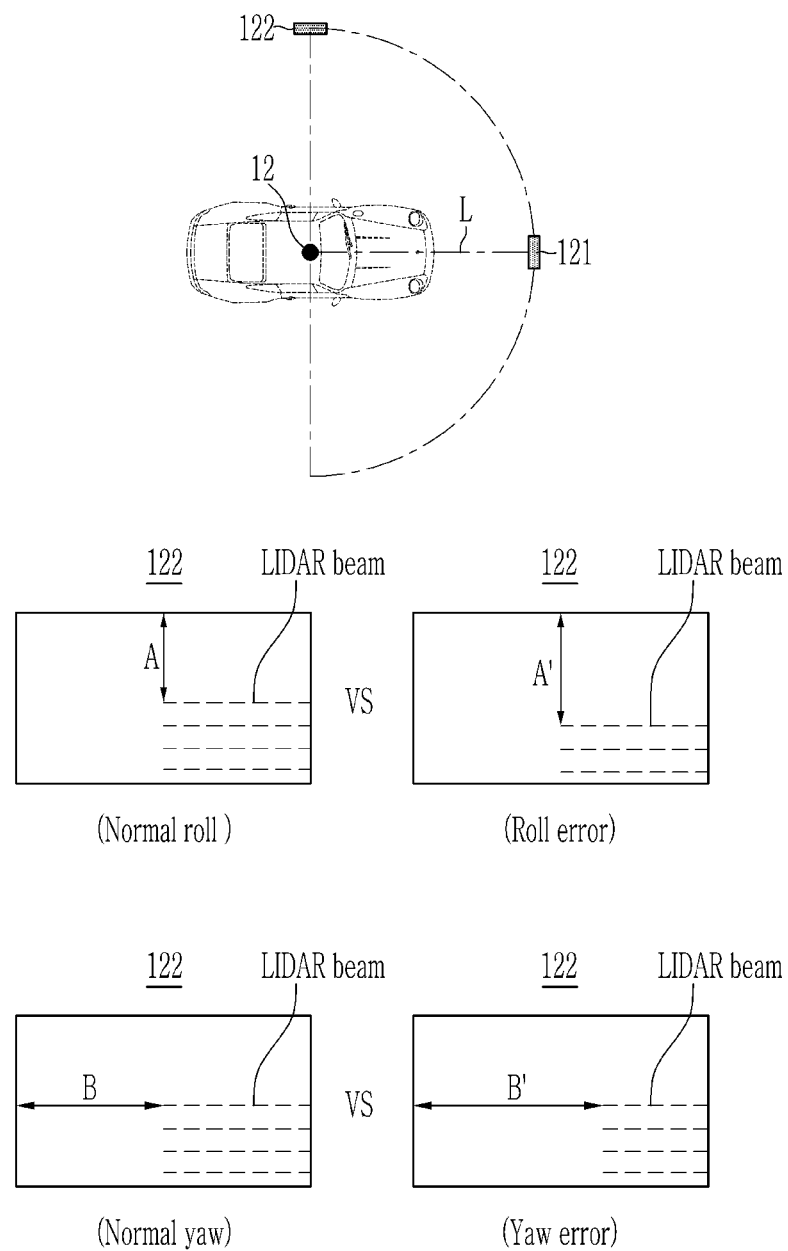
FIG. 7 is a top plan view illustrating a method of correcting pitch, roll, and yaw errors according to a second embodiment of the present disclosure.

Further, FIG. 7 is a top plan view illustrating a method of correcting pitch, roll, and yaw errors according to a second embodiment of the present disclosure.

Referring to FIG. 7, the control unit 144 may detect pitch and roll errors and a yaw error by using the first screen panel 121 and the second screen panel 122 installed at the front and left sides of the LIDAR sensor 12, and correct the roll error and the yaw error. In this case, the description of the pitch error correction method is the same as that of the first additional exemplary embodiment, thereby being omitted.

The control unit 144 may detect a roll error by comparing a distance A between the upper end of the screen and the LIDAR beam of the second screen panel 122 with a reference distance A set with a normal roll angle, and generate a sensor correction value for correcting the roll error.

Further, the control unit 144 may detect a yaw error by comparing a distance B' between the left end of the screen and the left end point of the LIDAR beam measured in the second screen panel 122 with a reference distance B at the normal yaw angle, and generate a sensor correction value for correcting the yaw error.

Figure 8:
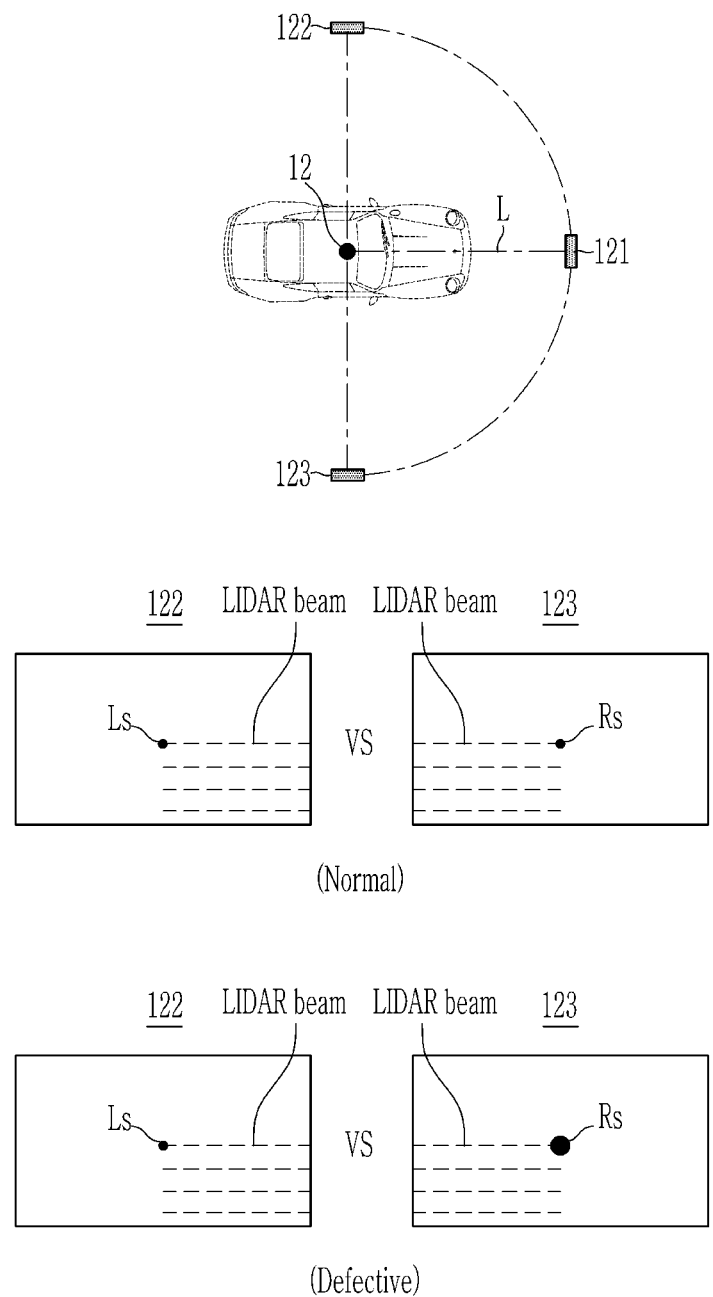
FIG. 8 is a top plan view illustrating a method of correcting pitch, roll, and yaw errors according to a third embodiment of the present disclosure.

Further, FIG. 8 is a top plan view illustrating a method of correcting pitch, roll, and yaw errors according to a third embodiment of the present disclosure.

Referring to FIG. 8, the control unit 144 may measure a three-dimensional coordinate (x, y, z) for a LIDAR beam vertex according to a pitch error, a roll error, and a yaw error by using the first, second, and third screen panels 121, 122, and 123 installed at the front, left, and right sides of the LIDAR sensor 12, detect a coordinate error by comparing the measured three-dimensional coordinate with a reference vertex coordinate set with normal pitch, roll, and yaw, and generate a sensor correction value for correcting the pitch error, the roll error, and the yaw error.

In this case, z in the three-dimensional coordinate for the uppermost end vertex of the LIDAR beam may be measured by comparing the values of A of the first screen panel 121 and the second screen panel 122, and x may be measured by comparing the values of B of the second screen panel 122 and the third screen panel 123. Further, y may be measured with spot size difference (Ls Vs Rs) of the uppermost end vertexes of the left/right LIDAR beams formed on the second screen panel 122 and the third screen panel 123. This utilizes the fact that the spot size is changed according to the transmission distance of the LIDAR beam.

Figure 9:
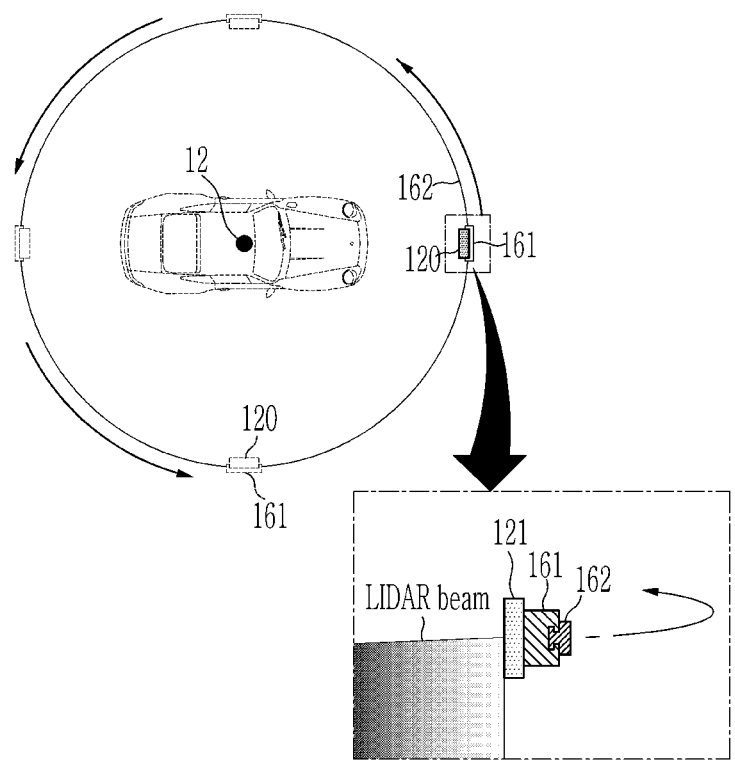
FIG. 9 is a diagram illustrating a 360-degree movable screen panel according to a fourth embodiment of the present disclosure.

Further, FIG. 9 is a diagram illustrating a 360-degree movable screen panel according to a fourth embodiment of the present disclosure.

Referring to FIG. 9, according to a fourth embodiment of the present disclosure, a single screen panel 120 may be coupled to a movable body 161 to be installed to be movable 360 degrees along a circular guide rail 162 centered on the LIDAR sensor 12 or the vehicle 10.

The control unit 144 may control a movement displacement of the screen panel 120 movably installed with respect to the LIDAR sensor 12 through the facility operation unit 142. In this case, the movable body 161 and the circular guide rail 162 are disposed around the LIDAR sensor 12. In this case, the screen panel 120 may be moved in front, left, rear, and right directions through the movable body 161 moving along the guide rail 162, and measure the LIDAR beam image projected at each position (in each direction) through the NIR camera 130.

Accordingly, it is possible to correct the error in the multi-LIDAR sensor system in which the sensors are installed in various places, and the 360-degree LIDAR sensor.

Figure 10:
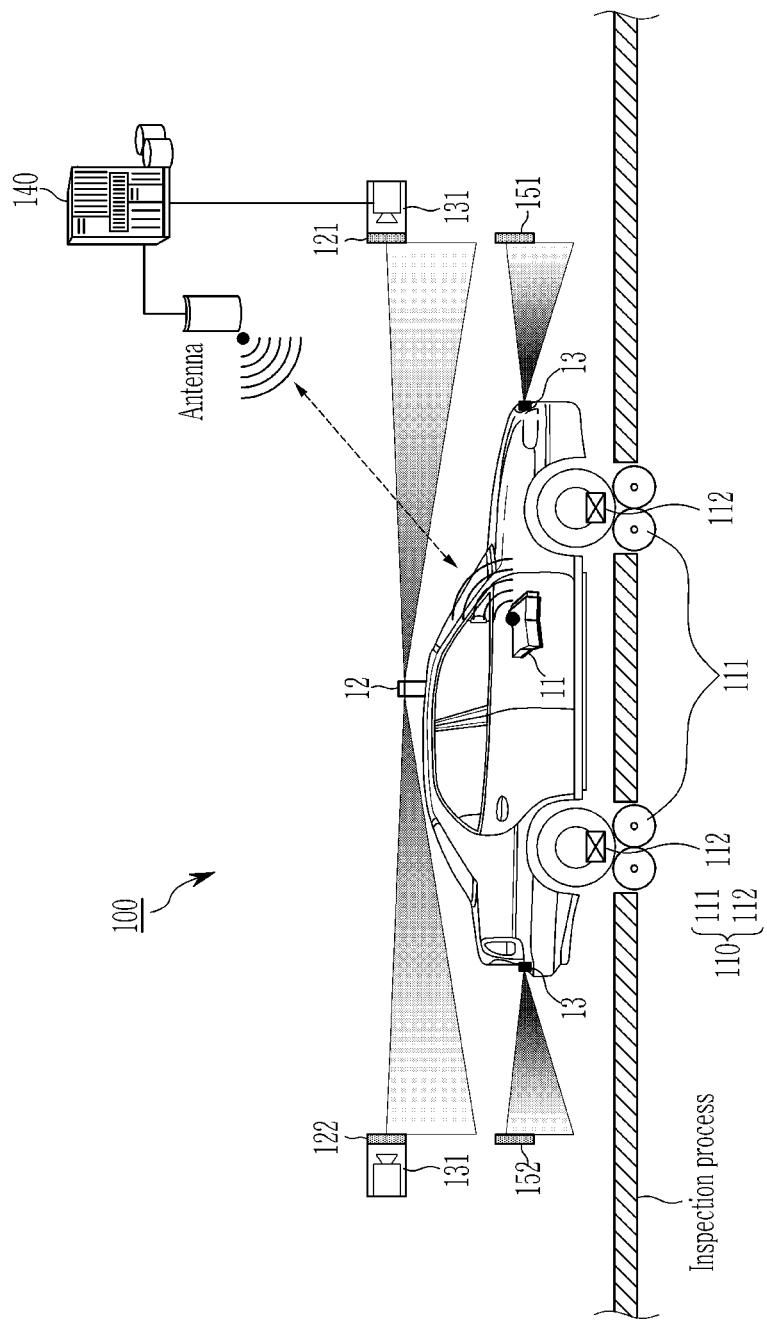
FIG. 10 is a diagram schematically illustrating a configuration of a system for inspecting a vehicle LIDAR sensor according to a fifth exemplary embodiment of the present disclosure.
Figure 11A:
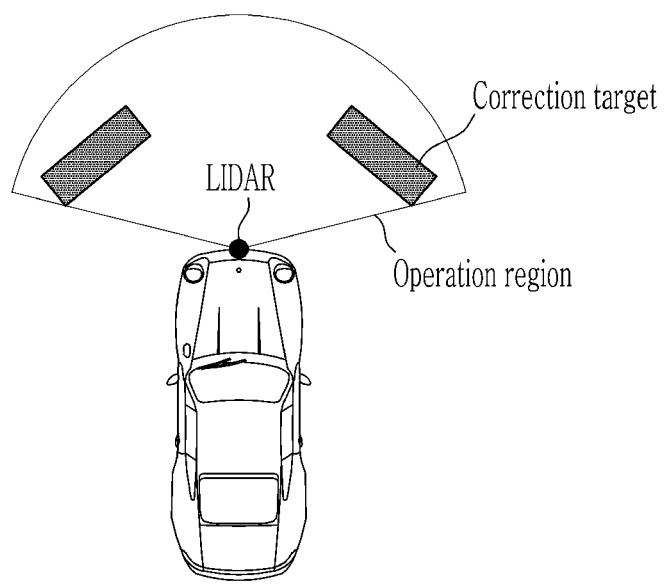
FIGS. 11A-11B (RELATED ART) illustrate a method of inspecting a LIDAR sensor in a vehicle factory in the related art.
Figure 11B:
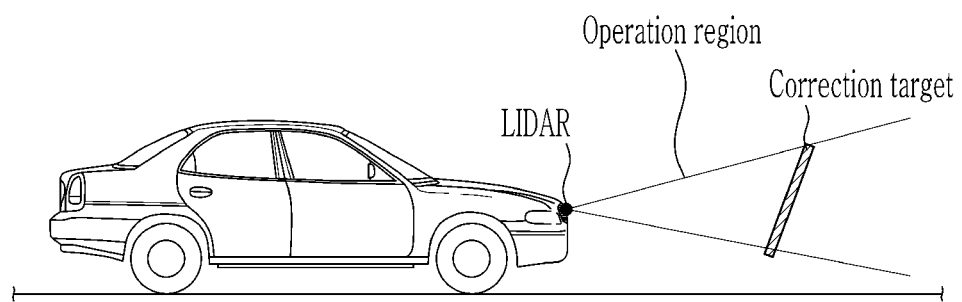

In the meantime, FIG. 10 is a diagram schematically illustrating a configuration of a system for inspecting a vehicle LIDAR sensor according to a fifth exemplary embodiment of the present disclosure.

Referring to FIG. 10, a system for inspecting a vehicle LIDAR sensor according to a fifth exemplary embodiment of the present disclosure is similar to that illustrated in FIG. 1, and the only difference is that a screen panel 120 and an NIR camera 130 are configured as an integrated measurement module in which the screen panel 120 and the NIR camera 130 are arranged side by side.

Like the foregoing various exemplary embodiments, the integrated measurement module may be installed in at least one direction among front, rear, left, and right directions of the vehicle.

The NIR camera 130 captures a LIDAR beam image projected on a screen panel 120 by a LIDAR sensor 12 and transmits the captured LIDAR beam image to a control unit 144.

In addition, the method of detecting and correcting the distortion error angle of the LIDAR sensor 12 and the method of simultaneously inspecting the heterogeneous sensors, such as the radar or the camera, by the server 140 may be applied in the same manner as those of the foregoing exemplary embodiments.

Further, in the exemplary embodiments of the present disclosure, it is described that the system is manufactured and installed so that the uppermost end point H of the LIDAR beam is projected on the center portion of the screen panel 120. However, the exemplary embodiment of the present disclosure is not limited thereto, the lowermost end point of the LIDAR beam may also be projected on the center portion of the screen panel 120.

Accordingly, the server 140 may detect an installation error of the LIDAR sensor 12 based on the lowermost end point of the LIDAR beam, generate a sensor correction value for self-correcting the installation error, and transmit the generated sensor correction value to the LIDAR sensor through the communication terminal equipped in the vehicle. The modified exemplary embodiment may be fully implemented through the description of the foregoing exemplary embodiment, so that a detailed description thereof will be omitted.

As described above, according to the exemplary embodiment of the present disclosure, an installation error of the LIDAR sensor is corrected by utilizing the screen panel that is smaller and lighter than the existing correction target and the NIR camera, so that a space required for the inspection process is reduced and inline application is easy.

Further, when the LIDAR sensor is inspected, it is possible to inspect the heterogeneous sensors, such as a radar or a camera, in parallel without space restriction by using the screen panel that does not adversely affect reflection and using the space secured by miniaturization.

Further, it is possible to precisely correct a pitch error, a roll error, and a yaw error by measuring a LIDAR beam in various directions by installing the miniaturized screen panel to be movable around the vehicle and the LIDAR sensor.

The exemplary embodiments of the present disclosure are not implemented only through the device and/or method described above, and may also be implemented through a program for realizing a function corresponding to the configuration of the exemplary embodiments of the present disclosure, a recording medium in which the program is recorded, and the like, and the implementation can be easily implemented by those skilled in the art from the description of the foregoing exemplary embodiment.

Although an exemplary embodiment of the present disclosure has been described in detail, the scope of the present disclosure is not limited by the embodiment. Various changes and modifications using the basic concept of the present disclosure defined in the accompanying claims by those skilled in the art shall be construed to belong to the scope of the present disclosure.

What is claimed is:

1. A system for inspecting a LIDAR sensor for correcting an error of the LIDAR sensor installed in a vehicle, the system comprising:
   a centering unit which aligns the vehicle entering an inspection process to match a reference inspection position of the LIDAR sensor;
   a plurality of screen panels installed at a set distance and a set height with respect to the LIDAR sensor and sized so that an uppermost end point of a LIDAR beam according to an irradiation angle of the LIDAR sensor is projected on a center portion of each of the screen panels;
   a Near Infrared (NIR) camera which captures the LIDAR beam projected on the screen panel through the LIDAR sensor; and
   a server which detects an installation error of the LIDAR sensor based on the uppermost end point of the LIDAR beam irradiated to each of the screen panels by comparing LIDAR beam images acquired from the plurality of screen panels through the NIR camera, generates a sensor correction value for self-correcting the installation error, and transmits the sensor correction value to the LIDAR sensor through a communication terminal equipped in the vehicle.

2. The system of claim 1, further comprising:
   a correction target installed in a lower space of the screen panel,
   wherein an irradiation angle of a heterogeneous sensor including a radar or a camera is inspected in parallel through the server.

3. The system of claim 1, wherein when a tire of the vehicle is seated on a driving roller, the centering unit physically presses each wheel through a mechanical position adjustment unit provided at a side of the vehicle and aligns the vehicle to match the reference inspection position.

4. The system of claim 1, wherein the NIR camera is disposed above the vehicle, and is installed rotatably toward each of the screen panels by a rotating body.

5. The system of claim 1, wherein the server includes:
   a communication unit configured to connect diagnosis communication with the communication terminal of the vehicle;
   a facility operating unit including an interface for interworking with facilities in the inspection process;
   a database which matches and stores an ID of the communication terminal equipped in the vehicle and a corresponding Vehicle Identification Number (VIN); and
   a control unit which controls a general operation for inspecting the LIDAR sensor, and recognizes the VIN matched to the unique ID of the communication terminal when the diagnosis communication is connected and sets installation information and an inspection reference of an autonomous driving sensor applied according to a product specification.

6. The system of claim 5, wherein the control unit calculates the uppermost end point of the LIDAR beam by using a vertical length of the screen panel, an installation height from the floor, and a distance between an upper end of the screen and the LIDAR beam according to the installation information by analyzing the LIDAR beam image.

7. The system of claim 6, wherein the control unit detects a pitch error by comparing the uppermost end points of the LIDAR beams of the screen panels positioned in front of and behind the LIDAR sensor.

8. The system of claim 7, wherein the control unit calculates a pitch error angle by using a difference value between the uppermost end point of a normal LIDAR beam and the uppermost end point of a defective LIDAR beam irradiated to the front screen panel and a distance between the LIDAR sensor and the screen.

9. The system of claim 6, wherein the control unit detects a roll error by comparing the uppermost end points of the LIDAR beams irradiated to the screen panels positioned at left and right sides of the LIDAR sensor.

10. The system of claim 9, wherein the control unit calculates a roll error angle by using a difference value between the uppermost end point of a normal LIDAR beam and the uppermost end point of a defective LIDAR beam irradiated to the screen panel positioned at the side of the LIDAR sensor and a distance between the LIDAR sensor and the screen.

11. The system of claim 9, wherein the control unit detects a yaw error by comparing a left end point and a right end point of the LIDAR beams irradiated to the screen panels positioned at the left side and the right side of the LIDAR sensor.

12. The system of claim 11, wherein the control unit calculates a yaw error angle by using a difference value between a normal end point and a defective end point of the LIDAR beam irradiated to the screen panel positioned at one side and a distance between the LIDAR sensor and the screen.

13. The system of claim 6, wherein the control unit detects a pitch error angle and a roll error angle by comparing a distance between an upper end of each screen and the LIDAR beam measured by using the screen panels positioned on the front and side of the LIDAR sensor with a reference distance set with a normal roll angle.

14. The system of claim 1, wherein the screen panel is coupled with a moving body and installed to be movable 360 degrees along a circular guide rail around the LIDAR sensor.

15. A method of inspecting a LIDAR sensor for correcting an error of the LIDAR sensor installed in a vehicle, the method comprising the steps of:
a) performing communication with a communication terminal of the vehicle entering an inspection process and aligning the vehicle to a reference inspection position of the LIDAR sensor through a centering unit;
b) capturing a LIDAR beam image irradiated from the LIDAR sensor to a screen panel through a Near Infrared (NIR) camera, wherein the screen panel is installed at a set distance and a set height with respect to the LIDAR sensor;
c) detecting an installation error of the LIDAR sensor based on an uppermost end point of a LIDAR beam irradiated to the screen panel by comparing LIDAR beam images acquired from the plurality of screen panels; and
d) generating a sensor correction value for self-correcting the installation error, and transmitting the sensor correction value to the LIDAR sensor through a communication terminal.

16. The method of claim 15, wherein step c) includes:
calculating a pitch error angle by using a difference value between the uppermost end point of a normal LIDAR beam and the uppermost end point of a defective LIDAR beam in the screen panel in front of the LIDAR sensor and a distance between the LIDAR sensor and the screen.

17. The method of claim 15, wherein step c) includes:
calculating a roll error angle by using a difference value between the uppermost end point of a normal LIDAR beam and the uppermost end point of a defective LIDAR beam in the screen panel positioned at the side of the LIDAR sensor and a distance between the LIDAR sensor and the screen.

18. The method of claim 17, wherein step c) includes:
calculating a yaw error angle by using a difference value between a normal end point and a defective end point of the LIDAR beam in the screen panels positioned at a left side and a right side of the LIDAR sensor and a distance between the LIDAR sensor and the screen.

19. The method of claim 15, wherein step d) includes:
checking whether the generated sensor correction value is in a range self-correctable by the LIDAR sensor and when the self-correction is possible, transmitting the generated sensor correction value to the communication terminal.

20. A system for inspecting a LIDAR sensor for correcting a LIDAR sensor error of a vehicle, the system comprising:
a centering unit which aligns a vehicle entering an inspection process to match a reference inspection position of a LIDAR sensor;
a Near Infrared (NIR) camera configured in an integrated module with a screen panel installed at a set distance and a set height within an operation range around the LIDAR sensor and captures a LIDAR beam image irradiated to the screen panel; and
a server which collects the LIDAR beam image captured by the NIR camera, inspects an installation error by comparing an uppermost end point of the LIDAR beam captured by each of the screen panels in front of and at a side of the LIDAR sensor and the uppermost end point of a normal LIDAR beam, generates a sensor correction value for self-correcting the installation error, and transmits the sensor correction value to the LIDAR sensor through a communication terminal equipped in the vehicle.

* * * * *